Apr. 24, 1923.

J. GOOD

ENGINE FUEL VAPORIZER

Filed Oct. 30, 1917

Inventor
By Attorney

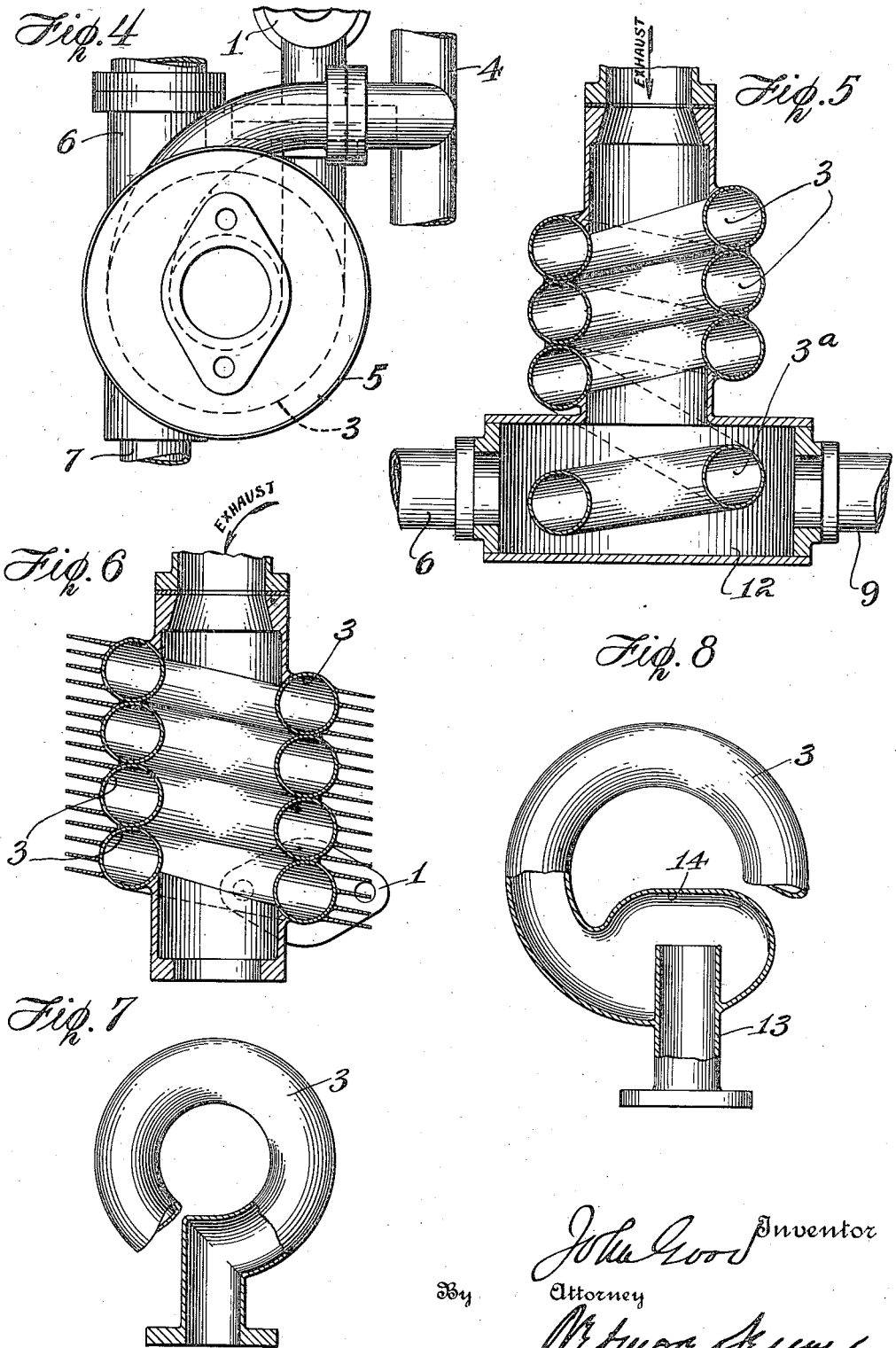

Patented Apr. 24, 1923.

1,452,683

UNITED STATES PATENT OFFICE.

JOHN GOOD, OF BROOKLYN, NEW YORK, ASSIGNOR TO GOOD INVENTIONS CO., OF BROOKLYN, NEW YORK, A CORPORATION OF NEW YORK.

ENGINE-FUEL VAPORIZER.

Application filed October 30, 1917. Serial No. 199,262.

*To all whom it may concern:*

Be it known that I, JOHN GOOD, United States citizen, residing in Brooklyn, New York, have invented the following described Improvements in Engine - Fuel Vaporizers.

The invention concerns the preparation of the fuel charge mixtures for internal combustion engines and other uses and consists in the apparatus hereinafter described whereby liquid fuel may be vaporized by the application of heat and its vapors may be mixed with the air component of the mixture without creating an unduly high temperature of the resultant charge such as might entail difficulties arising from the condensation of the vapor within the engine passages, or unduly impair the volumetric efficiency of the engine by reason of the thermally expanded condition of the heated charge. More especially it is an object of the invention to provide for the vaporization of liquid fuels of low volatility such as kerosene and related fuels without cracking them or producing in the resulting mixture what is known as free carbon and which has a deleterious effect on the engine structure and its general efficiency. The principle of the invention as will presently appear, is susceptible of application to vaporizer apparatus in a variety of forms all of which are intended to be included within the claims appended hereto.

In the accompanying drawing:

Fig. 4 is a top plan of Fig. 2 with the exhaust pipe connection removed;

Figs. 5 and 6 are longitudinal sections of further modifications of the vaporizer; and Figs. 7 and 8 are plan views, partly in section, of modifications of the entering spires of the vaporizers of the preceding figures.

Figure 1:
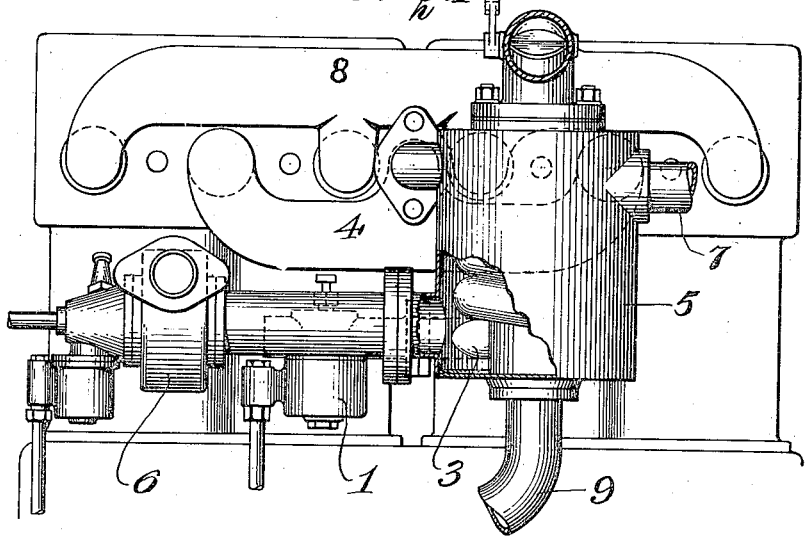
Fig. 1 is a general side view of a conventional type of internal combustion engine having the invention applied to it.
Figure 2:
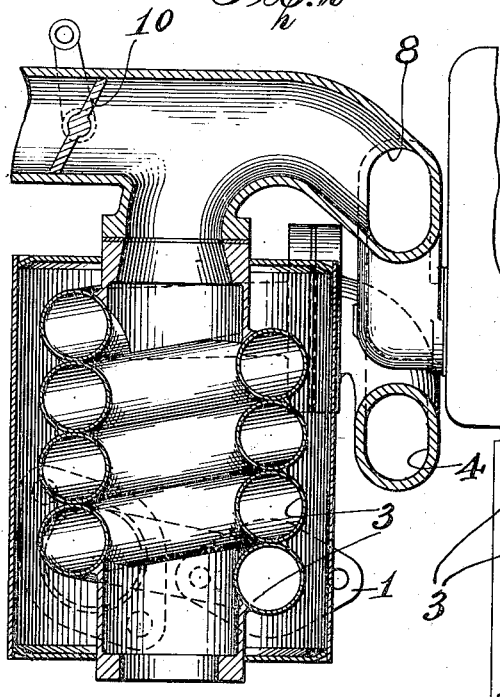
Fig. 2 is an enlarged scale longitudinal section of the vaporizing passage.

Referring to Fig. 1, a charge mixture of the liquid fuel and air is measured in the usual explosive proportions by means of a carburetor 1 which may be of any ordinary type. Under the control of a suitable throttle, which may be disposed at any point in the intake passage, this mixture is delivered into and through a coiled tube or helical passage 3 and thence passes into the intake manifold 4 for combustion within the engine. The casing 5, which encloses the coil 3 is connected to a forced draft burner-head 6 from which it receives a flame or blast of hot combustion products which escape through the pipe 7 at the top of the casing or otherwise. The construction of the burner-head 6 forms no part of the present invention and it may be regarded merely as representative of a source of heat. It is used in the present case for initially heating the coil 3 when the engine is cold, so that the fuel initially flowing through said coil to the engine will be sufficiently vaporized by such heating to enable the engine to take up its combustion cycle. When the burner-head or whatever source of preliminary heat that may be used, is applied to the exterior of the coil 3 as in the present case it is to be understood as ceasing its heating function when the engine is in its normal or working condition.

The exhaust gas from the engine is conducted in whole or in part, from the engine exhaust manifold 8, axially through the center of the coil 3 and out through the exhaust pipe 9 and the coil is so formed that the exhaust passage through it is isolated from the space exterior to the coil within the flame box 5, that is to say, the coiled tube itself forms part of the exhaust gas passage, the spires of the tubing being in mutual contact for this purpose. But other ways of associating the exhaust gas passage with the intake passage may also be used as will presently appear.

Figure 3:
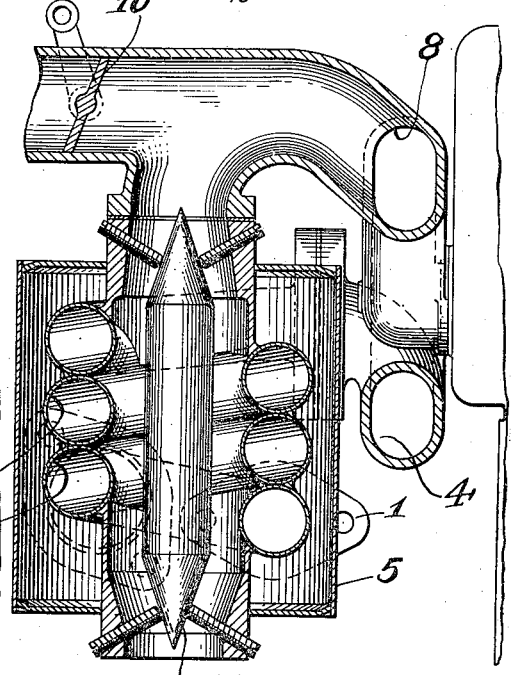
Fig. 3 is a longitudinal section of a modification of the vaporizer of Fig. 2.

Flow of exhaust gas within the helix 3 as above described will obviously heat only the inner side of the curved fuel passage and the outer side of said passage will not be heated thereby, except indirectly by conduction through the metal of the tubing, with the result that the outer side of the coil of tubing will be kept at a lower temperature. The fuel mixture may be understood to consist of air and liquid fuel particles together with some vapor of the fuel (more or less, in proportion to the volatility of the fuel used at the entering temperature at the carburetor). It may for example have the same characteristics as the fuel mixture delivered by the carburetors in ordinary automobile use. By reason of the inertia and centrifugal effect of passage through the curved tube, the liquid particles in the mixture will impinge and collect first upon the outer wall of the curved passage, but will presently form into a liquid stream flowing along the inner side of the passage, this being in accordance with the principle of separation of liquid from gases disclosed in my prior Patent No. 1,306,003, dated June 10, 1919. In consequence of this phenomenon, the liquid component of the entering charge selects a path of flow along and in contact with the highly heated inner wall of the coil or vaporizing passage 3, while the air component flows along the outer side of such passage which, as above stated, is preferably kept relatively cool, either by being left exposed to atmosphere as indicated in Fig. 5 for example, or by being provided with heat radiating fins as shown in Fig. 6 for example, or merely by not being heated at all. In the case of the coil enclosed in a pre-heater as described for Fig. 1. the burner head 6 might be employed to blow cold air instead of flame against the outside of the coil when the engine is in operation and as a means of cooling the air component of the charge. It is desirable that the air in the vaporizing passage be kept cool and that the liquid be heated as highly as will suffice to evaporate it and no higher and for this purpose an exhaust valve 10 is shown provided in the exhaust pipe connection to the coil for the purpose of regulating the flow through the latter. For the purpose of obtaining an adequately high temperature in the interior of the coil when the engine is idling or running on a reduced or minimum fuel supply, it is also sometimes desirable and useful to augment and concentrate the exhaust gas temperature by relatively restricting the flow passage within the coil as for example by introducing therein a double ended body such as shown at 11 in Fig. 3. This will tend to create a local high gas velocity contiguous to the inner wall of the helical vaporizing passage but without appreciably choking the escape of the exhaust and various other shapes and means may be used to create or maintain a requisite heat transfer to the liquid stream in the vaporizing passage.

By thus heating the liquid in the presence of the air with which it is to be mixed when burned, but without directly heating the air itself, I have discovered that a combustible fuel mixture is rapidly and effectually formed, having a very low ultimate temperature measured at its entrance to the engine manifold and furthermore, that complex liquid fuels may thus be safely and satisfactorily vaporized by the application to them of a degree of heat that would otherwise be certain to impair their combustion utility. For example the apparatus herein described is well adapted to develop a dry and in every way suitable gaseous mixture of kerosene and air having an inlet temperature as low as 200° F. with a correspondingly high efficiency for the engine.

For some conditions I prefer to pass the entire air component of the charge, through the vaporizing passage and in the presence of all the liquid component, so that the entire fuel mixture thus passes through the heated coil and I have shown this arrangement in Fig. 1, but while this arrangement is preferred as just stated it will be apparent that the principle of the invention is not confined thereto, since less than the whole of the air component aids in keeping down the ultimate temperature and avoids destructive distillation of the liquid.

The vaporizing passage may conveniently be of circular cross section as illustrated (a form in which the width of the cross section adjacent the exterior of the helix and the width of the cross section adjacent the interior axial passage through the helix are each less than the maximum width of the cross section measured transversely of the flow and parallel with the axis of the helix), or of any other contour that will provide, induce or maintain the described relation of separate contacting flow streams, whereby the liquid may be highly heated in the presence of relatively cooler air. It is desirable to this end that the air stream be of compact rather than extended section and this effect is attained by the vaporizing passages herein illustrated. The said passage should be long enough to accommodate the particular kind of fuel used and the heat available for vaporizing it. Its wall should be as thin as consistent with durability in order to facilitate the prompt transfer of heat. By way of example, I have found that for Ford automobile and similar engines, a one-inch tube wound into a helix of from three or four to seven turns and having an inside diameter of approximately two and one-half or three inches, provides a suitable vaporizer.

In Fig. 5 I have illustrated an arrangement of vaporizing passage whereby the exhaust gases from the engine heat the first or lower spire of the coil on both sides. The lower part of the coil is the part which first receives the incoming mixture from the carburetor and in which, as above described, the liquid particles impinge upon the outside wall of the coil and for this reason this spire is heated on the outside even though the effect of doing so may also be to raise the temperature somewhat of the air component. This degree of temperature increase is not however considered appreciable in view of the subsequent treatment of the mixture in this form. The lower spire marked 3ᵃ, is encased in a box 12 leading to the exhaust pipe 9. The flame tube of a burner-head 6 may be connected to the same box discharging into the same exhaust pipe, for vaporizing the initial fuel charge by heating the said spire 3ᵃ.

In Figs. 7 and 8 I have shown forms of entering spires designed to establish the liquid into stream form initially on the inner side of the curved vaporizing passage and so that it will at no time flow along the outer wall. In Fig. 8 the mixture from the carburetor enters an enlargement or bowl in the first spire through a short introduction tube 13. By giving the bowl and the tube proper relative dimensions, the liquid fuel particles by their momentum are caused to impinge on the opposite wall 14 of the bowl-shaped chamber there forming the liquid stream, while the air immediately takes up its course along the outer wall. In Fig. 7 the same effect is designed to be produced, although the separation in this case may not be initially so prompt nor so well defined.

Claims—

1. Vaporizing apparatus comprising a helical vaporizing passage and means for producing a flow of mixed air and liquid fuel therethrough, said passage having a curvilinear cross-section, the length of the passage and the velocity of flow being such that the liquid fuel separates from the air and travels along the inner side of the passage, and means for applying heat to the inner walls of the helix to directly heat the collected liquid flowing therein to vaporize the same.

2. Vaporizing apparatus comprising a helical vaporizing passage and means for producing a flow of mixed air and liquid fuel therethrough, said passage having a curvilinear cross-section, the length of the passage and the velocity of flow being such that the liquid fuel separates from the air and travels along the inner side of the passage, means for applying heat to the inner walls of the helix to directly heat the collected flowing liquid therein to vaporize the same, and a medium of lower temperature outside the helix.

3. Vaporizing apparatus for internal combustion engines comprising a helix providing a helical passage and an interior passage axial of the helix, means delivering a mixture of liquid fuel and air to one end of the helical passage, the other end of said passage being adapted to be connected to the engine intake ports, and means for heating the interior axial passage to vaporize the liquid fuel, the helical passage having a cross area the width of which adjacent the interior passage is less than its maximum width measured transversely of the flow and parallel with the axis of the helix.

4. The combination of an engine fuel vaporizer comprising a helical coil of tubing, the spaces between the spires of the tube being closed against escape of gas therethrough, thereby forming an axial passage, means connecting the engine exhaust ports to one end of the axial passage within the helix so that exhaust gas may pass therethrough, means for delivering a mixture of liquid fuel and air into one end of the helical passage, and means connecting the other end of the helical passage to the engine inlet ports.

5. The combination of claim 4 with means for creating a local high flow velocity of exhaust gas contiguous to the helical fuel and air passage.

6. The combination of an engine fuel vaporizer comprising a thin walled passage of helical shape, means delivering a mixture of liquid fuel and air into said passage, means whereby the engine exhaust gas heats interior walls of said helical passage and means for heating exterior walls of said passage when starting the engine in operation.

7. The combination of a helix providing a helical passage of curvilinear cross-section and a plurality of turns, means for delivering a mixture of liquid fuel and air to one end of said passage, the opposite end being adapted for connection to the engine intake ports, means for heating the interior of the helix by the engine exhaust gas, the exterior of the helix being unheated thereby, and means for heating the helix to start the engine.

8. The combination of a helix providing a helical passage of curvilinear cross section and a plurality of turns, means for delivering a mixture of liquid fuel and air to one end of said passage, said end being provided with an enlarged chamber to receive said mixture and an entrance tube to the chamber arranged to deposit the liquid fuel on a wall of the chamber from whence the chamber delivers the deposited liquid fuel to the inner side of the helical passage, the opposite end of the helical passage being adapted for connection to the engine intake ports, and means for heating the interior of the helix by the engine exhaust gas, the exterior of the helix being unheated thereby.

9. Vaporizing apparatus for internal combusion engines comprising a helix providing a helical passage and an interior passage axial of the helix, means delivering a mixture of liquid fuel and air to one end of the helical passage, the other end of said passage being adapted to be connected to the engine intake ports, and means for heating the interior axial passage to vaporize the liquid fuel, the helical passage having a cross area, the width of which adjacent the exterior of the helix is less than its maximum width measured transversely of the flow and parallel with the axis of the helix.

In testimony whereof, I have signed this specification.

JOHN GOOD.